(12) United States Patent
Tomkins et al.

(10) Patent No.: US 12,007,968 B2
(45) Date of Patent: Jun. 11, 2024

(54) FULL ALLOCATION VOLUME TO DEDUPLICATION VOLUME MIGRATION IN A STORAGE SYSTEM

(71) Applicant: INTERNATIONAL BUSINESS MACHINES CORPORATION, Armonk, NY (US)

(72) Inventors: Dominic Tomkins, Alton (GB); Miles Mulholland, Eastleigh (GB); Eric John Bartlett, Chard (GB); Alex Dicks, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/804,109

(22) Filed: May 26, 2022

(65) Prior Publication Data

US 2023/0385250 A1 Nov. 30, 2023

(51) Int. Cl.
*G06F 16/21* (2019.01)
*G06F 16/215* (2019.01)

(52) U.S. Cl.
CPC .................................. *G06F 16/215* (2019.01)

(58) Field of Classification Search
CPC ..... G06F 16/215; G06F 16/217; G06F 16/219
See application file for complete search history.

(56) References Cited

U.S. PATENT DOCUMENTS

| | | | |
|---|---|---|---|
| 9,665,287 B2 | 5/2017 | Li | |
| 10,444,996 B2 | 10/2019 | Cashman | |
| 10,956,286 B2 * | 3/2021 | Vijayan | G06F 11/3006 |
| 11,314,433 B1 * | 4/2022 | Barrell | G06F 9/5005 |
| 2014/0114933 A1 | 4/2014 | Chandrasekarasastry | |
| 2014/0359244 A1 | 12/2014 | Chambliss | |
| 2016/0132523 A1 | 5/2016 | Traeger | |
| 2017/0300424 A1 | 10/2017 | Beaverson | |
| 2018/0060367 A1 * | 3/2018 | Ioannou | G06F 16/215 |
| 2021/0117392 A1 * | 4/2021 | Sanders | G06F 16/215 |
| 2021/0157777 A1 | 5/2021 | Yang | |
| 2021/0271397 A1 | 9/2021 | Wu | |

FOREIGN PATENT DOCUMENTS

| | | |
|---|---|---|
| CN | 113590535 B | 12/2021 |
| WO | 2021108344 A1 | 6/2021 |

OTHER PUBLICATIONS

Mell et al., "The NIST Definition of Cloud Computing", National Institute of Standards and Technology, Special Publication 800-145, Sep. 2011, pp. 1-7.
International Search Report and Written Opinion, International Application No. PCT/EP2023/063345, International Filing Date May 17, 2023.

* cited by examiner

*Primary Examiner* — Loc Tran
(74) *Attorney, Agent, or Firm* — Michael O'Keefe (57) ABSTRACT

A method, computer program product, and computer system for full allocation volume to deduplication volume migration in a storage system. The method includes moving a physical allocation of stored data associated with a full allocation volume into a virtual address range in a deduplication domain and setting up the deduplication metadata to be a passthrough. The method then performs a background deduplication process on the virtual address range once populated with the physical allocations using a drive query hash interface to perform hash calculations on physical drives at which the data is stored.

18 Claims, 9 Drawing Sheets

FULL ALLOCATION VOLUME TO DEDUPLICATION VOLUME MIGRATION IN A STORAGE SYSTEM

BACKGROUND

The present invention relates to storage systems, and more specifically, to migration of fully allocated volumes to deduplication volumes.

A common feature found in storage controllers and appliances today is data deduplication. There is an ever increasing demand to store more user data with the same physical capacity, which reduces the overall cost of ownership of the storage system. Data deduplication works by identifying repeated data patterns and instead of storing the user data, it will create a reference to the duplicate data that is stored elsewhere in the system. It may be that the existing duplicate is within the same volume, another volume either in the same pool or another pool within the storage system, or within a volume used by another host.

Fully allocated volumes have all of their capacity allocated upfront and the storage system has minimal interaction with the data beyond caching and RAID operations. Customers may have both fully allocated and deduplicated volumes in the same storage pool.

It is common for customers to have a mixture of both deduplicated volumes and fully allocated volumes in a pool. Deduplication is a newer technology and so a migration path from fully allocated to deduplicated is both valuable and required.

Current state of the art involves making multiple copies of the data in order to perform the migration, or reading all of the data and writing it to a new location within the pool.

SUMMARY

According to an embodiment of the present invention, there is provided a computer-implemented method for full allocation volume to deduplication volume migration in a storage system. The method is carried out by one or more processors of a computer system and includes moving a physical allocation of stored data associated with a full allocation volume into a virtual address range in a deduplication domain and setting up the deduplication metadata to be a passthrough. A background deduplication process is performed on the virtual address range once populated with the physical allocations using a drive query hash interface to perform hash calculations on physical drives at which the data is stored. The virtual address range becomes a deduplicated volume for the data.

This provides an improvement of using spare computational power within the drive layer to calculate deduplication hashes. This allows for the volume migration to have low computational requirements as data does not need to be read outside the physical drive.

The method may include refraining from moving data stored on the physical drives during the method. This provides an improvement that there is no requirement to write data to a new location during the volume migration.

The method may include pausing input/output operations whilst moving a physical allocation of stored data associated with a full allocation volume into a virtual address range in a deduplication domain. This provides an improvement of avoiding any conflict with the underlying data during the movement of the physical allocation.

The method may include reserving, by a deduplication layer, the virtual address range in the deduplication domain to which the physical allocations associated with the fully allocated volume are moved.

Setting up the deduplication metadata to be a passthrough may include: creating a passthrough forward lookup structure for assimilation of the fully allocated volume to the deduplicated volume and creating a stub backward lookup structure to be updated with deduplication metadata as the deduplicated volume is deduplicated.

Moving a physical allocation of stored data associated with a full allocation volume into a virtual address range in a deduplication domain may be carried out by a virtualization layer and may include marking the volume as a deduplicated volume and activating a deduplication layer and the passthrough metadata.

Performing a background deduplication process may include iterating over grains of the deduplication volume by a deduplication layer with locking of a grain to an input/output operation during a grain deduplication.

Iterating over grains may include: when a grain is a deduplication hit, creating referrer metadata on a passthrough forward lookup structure to point to source metadata and marking the grain as invalid. When a grain is a deduplication miss, a hash is stored for the grain in a deduplication fingerprint database, creating source metadata on the passthrough forward lookup structure to point to grain on data disk. For all grains, a backward lookup structure is updated with invalidations or virtual addresses.

The method may include carrying out hash calculations at a Flash Core Module (FCM) on the drive layer without reading the data from outside the FCM.

According to another embodiment of the present invention, there is provided a system for full allocation volume to deduplication volume migration in a storage system including a processor and a memory configured to provide computer program instructions to the processor to execute the function of the components. The system includes a physical allocation moving component in a virtualization layer for moving a physical allocation of stored data associated with a full allocation volume into a virtual address range in a deduplication domain. A deduplication metadata setting up component is provided for setting up the deduplication metadata to be a passthrough. A deduplication component of a deduplication layer is provided for performing a background deduplication process on the virtual address range once populated with the physical allocations using a drive query hash interface to perform hash calculations on physical drives at which the data is stored. The virtual address range becomes a deduplicated volume for the data.

This provides a system having an improvement of using spare computational power within the drive layer to calculate deduplication hashes. This allows for the volume migration to have low computational requirements.

The physical allocation of stored data may be a managed disk of data extents associated with physical data extents stored across a plurality of physical drives having excess compute capability at which hash calculations for the deduplication process are performed. The plurality of physical drives may be Flash Core Modules (FCM) with hash calculation capability.

The system may include a pausing component for pausing input/output operations whilst moving a physical allocation of stored data associated with a full allocation volume into a virtual address range in a deduplication domain.

The system may include a reserving component in the deduplication layer for reserving the virtual address range in the deduplication domain to which the physical allocations associated with the fully allocated volume are moved.

The deduplication metadata setting up component may include a forward lookup component for creating a passthrough forward lookup structure for assimilation of the fully allocated volume to the deduplicated volume. A backward lookup component is included for creating a stub backward lookup structure to be updated with deduplication metadata as the deduplicated volume is deduplicated.

The physical allocation moving component may include marking the volume as a deduplicated volume and activating a deduplication layer and the passthrough metadata.

The deduplication component may include a grain iterating component for iterating over grains of the deduplication volume by a deduplication layer with locking of a grain to an input/output operation during a grain deduplication.

The grain iterating component may include a hit component for, when a grain is a deduplication hit, creating referrer metadata on a passthrough forward lookup structure to point to source metadata and marking the grain as invalid. A miss component is included for, when a grain is a deduplication miss, storing a hash for the grain in a deduplication fingerprint database, creating source metadata on the passthrough forward lookup structure to point to grain on data disk. A backward lookup update component is included for updating a backward lookup structure with invalidations or virtual addresses.

According to another embodiment of the present invention, there is provided a computer program product for full allocation volume to deduplication volume migration in a storage system. The computer program product includes a computer readable storage medium having program instructions embodied therewith. The program instructions are executable by a processor to cause the processor to move a physical allocation of stored data associated with a full allocation volume into a virtual address range in a deduplication domain and set up the deduplication metadata to be a passthrough. A background deduplication process is performed on the virtual address range once populated with the physical allocations using a drive query hash interface to perform hash calculations on physical drives at which the data is stored. The virtual address range becomes a deduplicated volume for the data.

The computer readable storage medium may be a non-transitory computer readable storage medium and the computer readable program code may be executable by a processing circuit.

BRIEF DESCRIPTION OF THE DRAWINGS

Exemplary embodiments of the present invention will now be described, by way of example only, with reference to the accompanying drawings. The present invention, both as to organization and method of operation, together with objects, features, and improvements thereof, may best be understood by reference to the following detailed description when read in conjunction with the accompanying drawings. However, it shall be understood that these embodiments are merely illustrative to facilitate better understanding. The scope of the present invention is dictated by the claims.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Exemplary embodiments of the present invention including a method, system, and computer program product are provided for volume migration from a fully allocated provisioning to a deduplication volume within a storage pool. However, it shall be understood that the scope of the present inventive concept is not limited thereto. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

A deduplication migration coordinator component may be provided that is responsible for an intra-pool volume migration from a fully allocated volume to a deduplication volume. The migration is optimized and uses spare computational power within the drive layer to calculate deduplication hashes of logical address ranges on the drive layer itself. Calculating hash calculations for deduplication migration on the drive layer allows for the migration to have low system computational requirements and removes the need for reading of the data on disk from outside the drive itself.

The described migration method removes the requirement to write data to a new location during the migration. Additional capacity or "swing space" is not required for this migration process and existing fully allocated capacity is quickly assimilated into the deduplication domain, which simplifies the storage management during the migration process.

The migration to deduplicated volumes is an improvement in the technical field of computer storage systems and provides more efficient storage solutions.

Physical storage drives increasingly include excess compute capabilities to perform advanced functions at the drive layer. For example, Flash core modules (FCMs) have the capability to encrypt or compress data. FCM drives typically do not leverage their full computational power in order to provide their day-to-day function. In addition to this, FCMs make use of field programmable gate arrays (FPGAs), which are extremely flexible compute units which can be leveraged to efficiently perform hash calculations (for example, SHA-1 calculations). The described method and system provide a harnessing of this spare computational power within a storage environment.

Deduplication is a technology that determines whether a grain of data already exists on a storage controller and, instead of writing the data out again, a metadata structure is updated to point at the owner of the existing piece of storage and to increment a reference count for that entry. The referencing is typically achieved by taking an incoming IO, hashing it with an algorithm such as SHA-1 and comparing a fragment of the hash with a database of existing IOs. In the event of a deduplication hit, the storage has effectively written a small amount of metadata rather than the data itself, hence providing a capacity saving to the user.

It is common for storage users to have a mixture of both deduplicated volumes and fully allocated volumes in a pool. Deduplication is a newer technology and so a migration path from fully allocated to deduplicated is both valuable and required.

Figure 1:
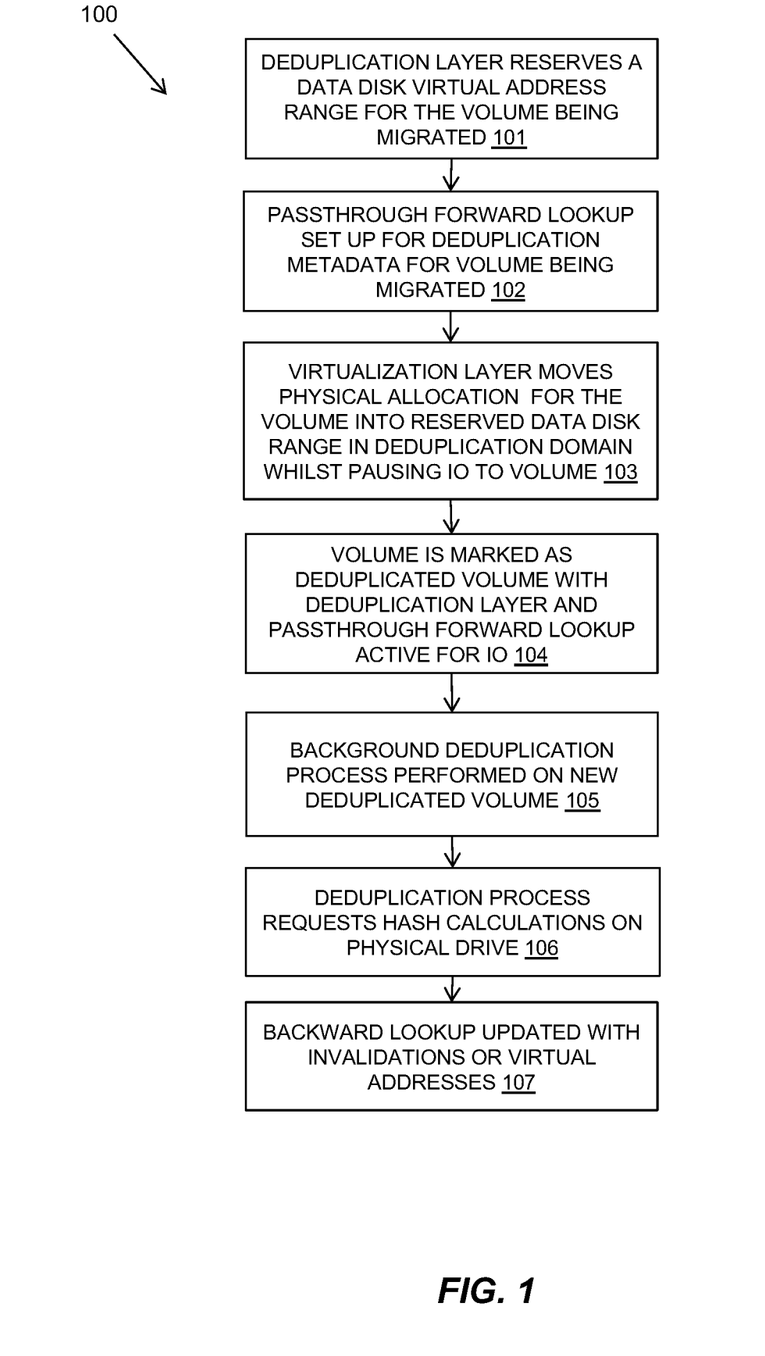
FIG. 1 is a flow diagram illustrating a method in accordance with an exemplary embodiment of the present invention.

Referring to FIG. 1, a flow diagram 100 shows an example embodiment of the described method for migration of a fully allocated volume to a deduplicated volume in a storage pool.

An initial stage may be carried out by a deduplication layer to reserve a data disk virtual address range for the allocated physical extents currently associated with the fully allocated volume to be migrated (step 101). The reserved data disk virtual address range may be an address range at this stage of a virtual region of the data disk that is currently not associated with any physical disk extents and/or is not currently in use. The migration process may move the allocated physical disk extents that are associated with the fully allocated volume to this virtual region. As the reserved virtual region is in the deduplication domain, this will become the deduplication volume.

The initial stage of the method may set up a passthrough forward lookup structure to set up the deduplication metadata to be a passthrough for assimilation of the fully allocated volume (step 102). The desired properties of the forward lookup structure are that if a read is attempted against the structure and no entry is found, then the original fully allocated volume should be read. This is what is intended by 'passthrough' with an empty structure resulting in reads against the fully allocated volume. The passthrough forward lookup structure may map each virtual address in the fully allocated volume to a virtual address in the reserved virtual address range in the deduplication domain. A stub backward lookup structure may also be created for updating deduplication metadata (e.g., "on-the-fly") during the migration process.

The physical allocation of stored data associated with the full allocation volume may be moved into the reserved data disk virtual address range in the deduplication domain whilst pausing IO to volume (step 103). This may be carried out in the virtualization layer and the IO may be paused for the volume whilst the physical allocation is moved.

Once the physical allocation extents for the volume are mapped to the reserved virtual region in the deduplication domain, the ownership of this data may be passed into the deduplication control, with the data disk being the owner of the data.

As part of the moving, the method may mark the volume as a deduplicated volume with the deduplication layer and passthrough forward lookup structure activated for new IO operations (step 104). The IO may be paused so that there is no conflict with the underlying data during the move of the physical allocation and whilst the deduplication metadata is set up.

The method may perform a background deduplication process on the newly populated virtual address range grains (step 105).

The deduplication process may use a drive query hash interface to request hash calculations to be carried out by the physical drives at which the data is stored (step 106). The background deduplication may iterate over the grains of the volume querying down to the drive layer for hash calculations.

The method may update the backward lookup structure (e.g., on-the-fly) with invalidations or virtual addresses and provide deduplication metadata (step 107).

In this way, the method may use a combination of data disk virtual reservation, virtual mapping manipulation, and/or drive layer hash calculation offloading. The initial assimilation of the fully allocated volume may be via a passthrough forward lookup structure, with on-the-fly backward lookup structure updating.

The method may allow for migration of the allocation of physical storage from a fully allocated volume to a deduplication volume without the need to read the underlying data or write that data to a new location on physical storage in the pool. The data that is still needed stays on the physical drives they are already on.

Figure 2:
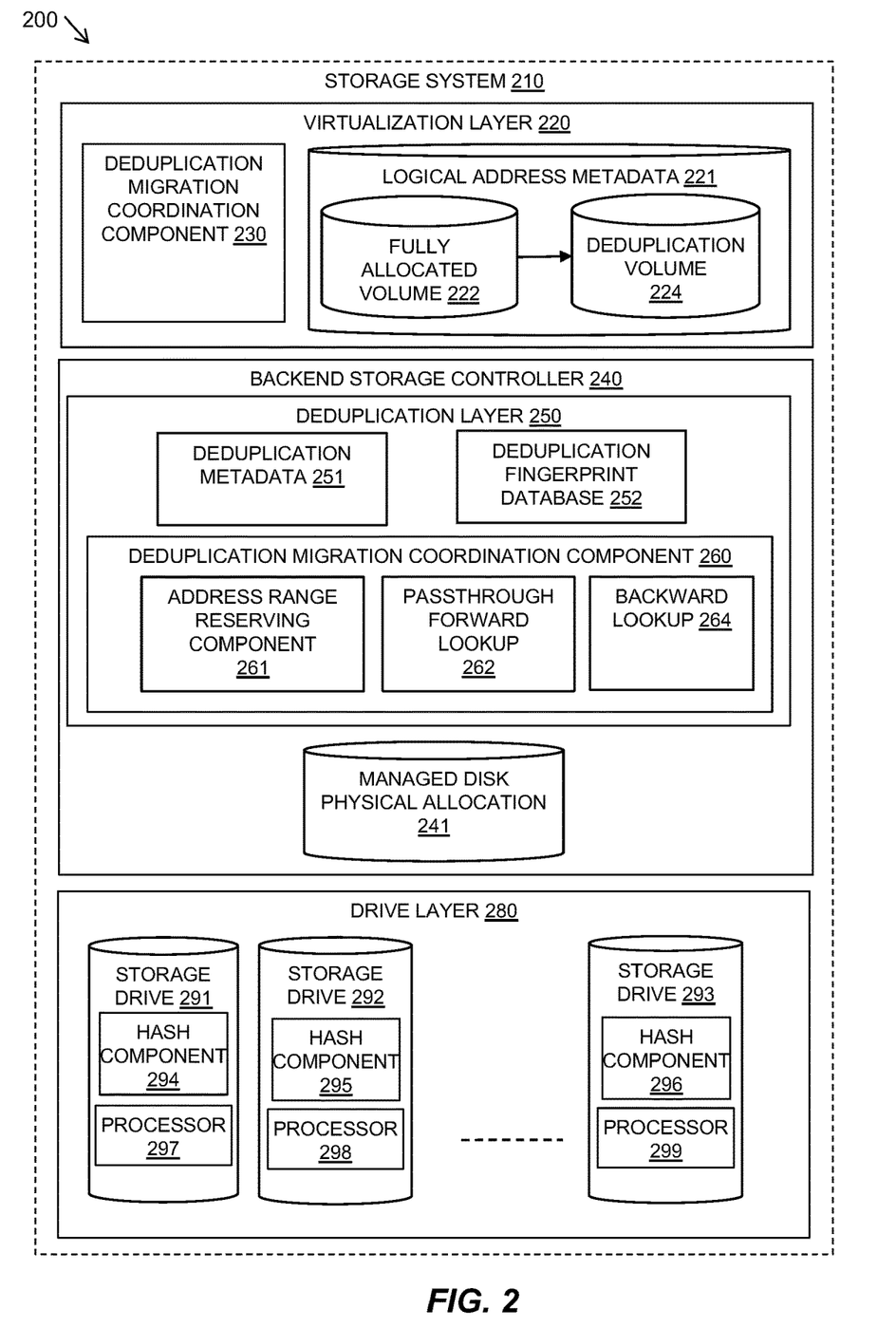
FIG. 2 is a block diagram illustrating a storage system in accordance with an exemplary embodiment of the present invention.

Referring to FIG. 2, a schematic block diagram 200 shows an example embodiment of a storage system 210 in which the described method and system may be implemented. To illustrate the described method, the storage system 210 shows a virtualization layer 220, a deduplication layer 250, and a drive layer 280. The arrangement of the components of the system is illustrative and should not be considered limiting to possible embodiments.

The storage system 210 may provide storage for host applications at one or more host servers having storage interfaces through which input/output (IO) operations may be handled for writing and reading data to and from the storage system 210.

The storage system 210 may include a virtualizing storage controller providing the virtualization layer 220. The virtualization layer 220 may receive host IO operations from host applications to logical volumes of data disks having logical addresses of data blocks. The virtualization layer 220 may present logical addresses to hosts and maintain logical address metadata 221 providing logical to physical address mappings providing virtualization of the storage system 210. The logical addresses may be provided as volumes that are presented to attached hosts.

The described method may include a deduplication migration coordination component 230 at the virtualization layer 220 that moves managed disk physical allocations 241 of the backend data extents associated with a fully allocated volume 222 to a reserved data disk virtual address range for a new deduplication volume 224.

The virtualization layer 220 may maintain a log-structure array (LSA) structure which is used to describe the logical-to-physical layout of block devices in a storage system. LSA structures may be used in storage systems because they offer an easy way to implement many different data reduction techniques and are agnostic about the type of storage backend. LSA storage systems may use logical block addressing of logical block addresses (LBAs) in a virtual domain to reference physical addresses at the storage backend. A host application may only need to provide the LBA without knowing anything of the physical backend.

The storage system 210 may include a backend storage controller 240. The backend storage controller 240 may include another deduplication migration coordination component 260 providing a deduplication layer 250 for deduplication of data stored at the physical drive layer 280. Deduplication may be used for removing duplications from stored chunks of data by pointing to a stored chunk using deduplication metadata 251. The deduplication process may begin by creating a unique digital fingerprint or signature for a given chunk of data by applying a hash function. This fingerprint value may be saved in an indexed fingerprint database 252 and compared to fingerprint values that are created for new incoming data chunks. By comparing fingerprint values, it may be determined if a chunk of data is unique or if it is a duplicate of an already stored data block.

Deduplication metadata 251 may provide mappings to the address of the stored data blocks. The deduplication metadata 251 may include a forward lookup structure that describes the virtual to physical mapping, such as using a B-Tree. A source chunk may be a chunk of data that stores the original copy of the data, a referrer chunk may be a symbolic link to the source chunk's data. The source chunk may contain a count of the number of referrers that are referring back to the source. The source chunk may know how many chunks are referring to it, but it might not know which chunks.

The backend storage system controller 240 may also include various functionalities, such as a garbage collection component for garbage collection of storage extents in the physical drive layer 280.

The described deduplication layer 250 may include another deduplication migration coordination component 260 that may include an address range reserving component 261 that may reserve a range of logical addresses for the new deduplication volume 224. A passthrough forward lookup structure 262 may be used to assimilate the fully allocated volume 222 by creating source metadata pointing to grains on the physical data disk and deduplication referrer metadata to point to source metadata. A backward lookup 264 may be used to record updates on-the-fly of invalidations and/or virtual addresses of the migrated volume.

A managed disk of physical allocations 241 may be maintained in the backend storage controller 240 as a logical unit of physical storage that might not be visible to a host. The managed disk physical allocation 241 may be assigned to a storage pool and provide extents that the volumes can use. The managed disk physical allocation 241 may be presented as a single logical disk that may provide usable blocks of physical storage without a one-to-one requirement to correspond to a physical drive.

The drive layer 280 may include storage drives 291-293 of non-volatile storage that may provide a physical storage pool. The storage drives 291-293 may be in the form of modules and may each have a processor 297-299, respectively. The storage drives 291-293 may include a deduplication hash component 294-296, respectively, to which the deduplication hash calculations may be off-loaded for the data on that corresponding drive.

The storage drives 291-293 may have a capability to have excess compute and may ask a drive to compute a hash calculation on data regions on the drive. In an example embodiment, the storage drives 291-293 may be Flash Core Modules (FCM). FCMs may be compressing drives, and as part of this mechanism, they may calculate hashe. FCMs may already have the capability to compute hashes, and depending on the scheme, scope, and size of the hash, they may already have the hash calculated and stored.

The described method may provide a fast and efficient mechanism for intra-pool migration of fully allocated volumes to deduplicated volumes on physical flash drive arrays. Deduplication hash workload may be offloaded to the drive that the data is on. Deduplication hashing can be performed either by performing SHA-1 calculations on the CPU itself or on PCI-e connected compute boards, such as Lewisburg.

Migration may take place without unnecessary reading and writing of volume data outside of the drive layer. Thus, data might not be duplicated within a pool as a result of the migration and additional storage might not be required during the migration. Source data that is unique might not be moved or altered. A customer may quickly see their pool capacity consumption drop for volumes with high levels of deduplication.

Figure 3A:
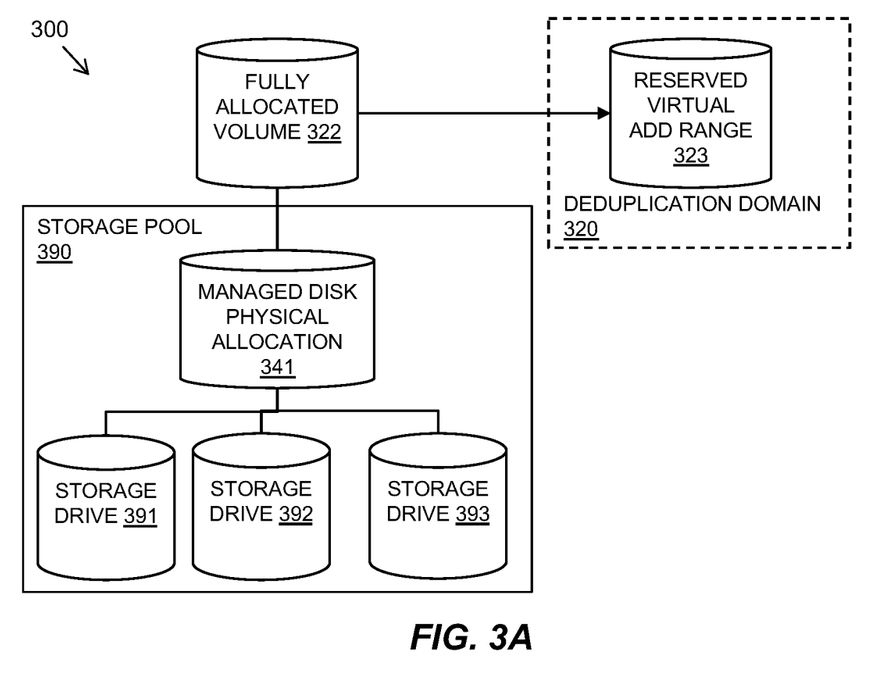
FIGS. 3A and 3B are schematic diagrams illustrating an example embodiment of a method in accordance with an exemplary embodiment of the present invention.
Figure 3B:
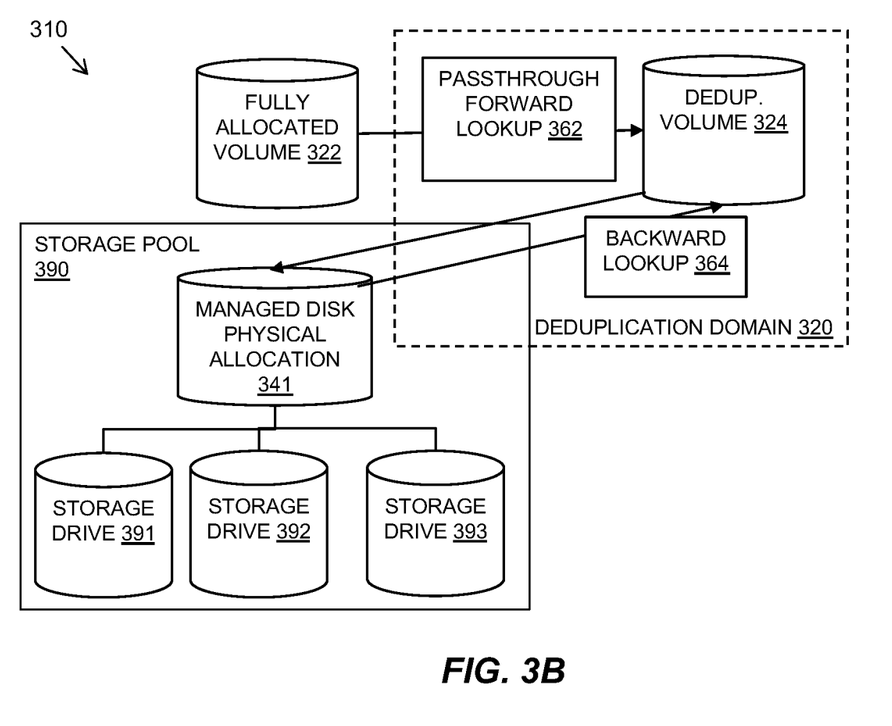

Referring to FIGS. 3A and 3B, schematic diagrams 300, 310 shows an illustration of an example embodiment of the described method.

In FIG. 3A, an initial stage is illustrated with a fully allocated volume 322 presented by a virtualizing layer to a host. The fully allocated volume 322 may have associated physical allocations provided by a managed disk physical allocation 341 in the backend storage. The managed disk physical allocation 341 may present a logical unit of physical storage that provides usable blocks of physical storage in storage drives 391-393 in an assigned storage pool 390.

The method may reserve a virtual address range 323 in the deduplication domain 320 to which the data of the fully allocated volume 322 is to be migrated and then deduplicated to become a deduplicated volume 324 (shown in FIG. 3B). At the stage shown in FIG. 3A, the volume may still be fully allocated and IOs might not engage with the deduplication domain.

FIG. 3B shows the situation after the virtualization layer moves the physical allocations for the volume provided by the managed disk physical allocation 341 to the reserved virtual address range 323 in the deduplication domain 320. During the moving of the physical allocations, IOs for the volume may be paused.

A passthrough forward lookup structure 362 may be provided in the deduplication domain 320 for deduplication metadata of the new deduplication volume 324 address directed from the fully allocated volume 322 address. A backward lookup structure 364 may be updated in the deduplication domain 320 to point to the deduplication volume 324 from the managed disk physical allocation 341.

A background deduplication process may then be performed on the new deduplicated volume 324 with hash calculations offloaded to the processing capabilities of the storage drives 391-393 on which the physical data is stored. The physical data might not move during the migration to the deduplication volume 324.

Figure 4A:
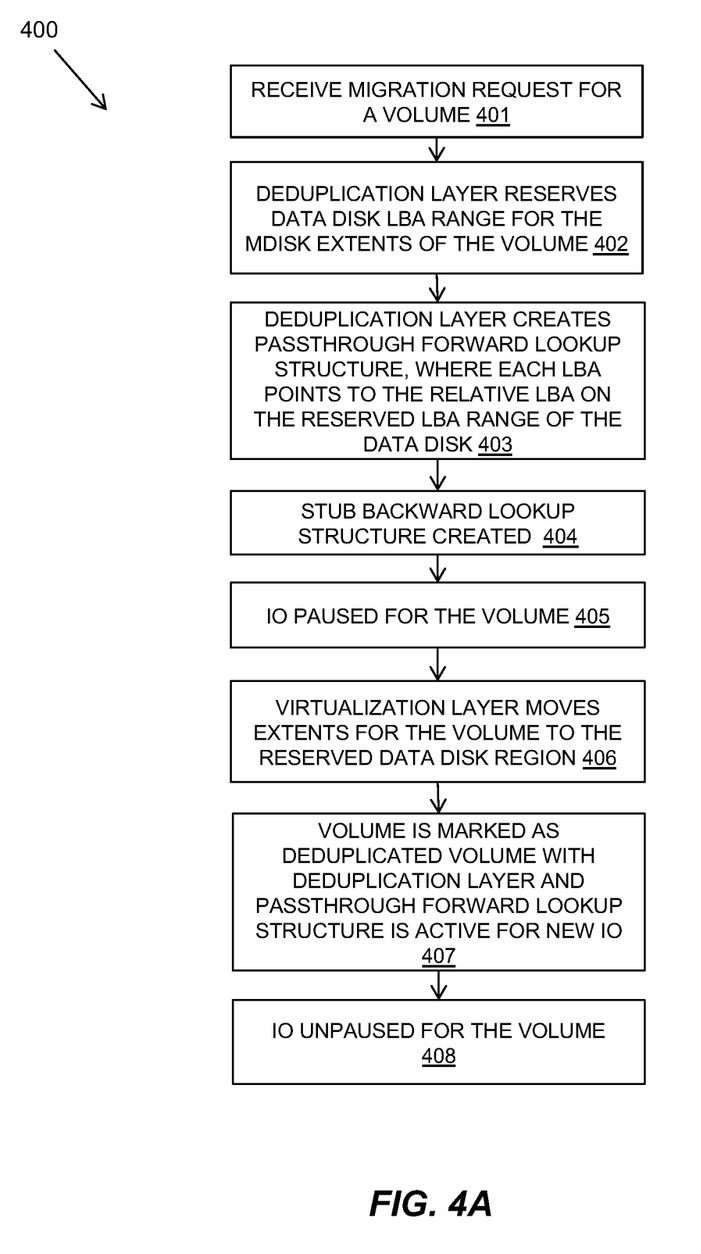
FIGS. 4A and 4B are flow diagrams illustrating a method in accordance with an exemplary embodiment of the present invention.
Figure 4B:
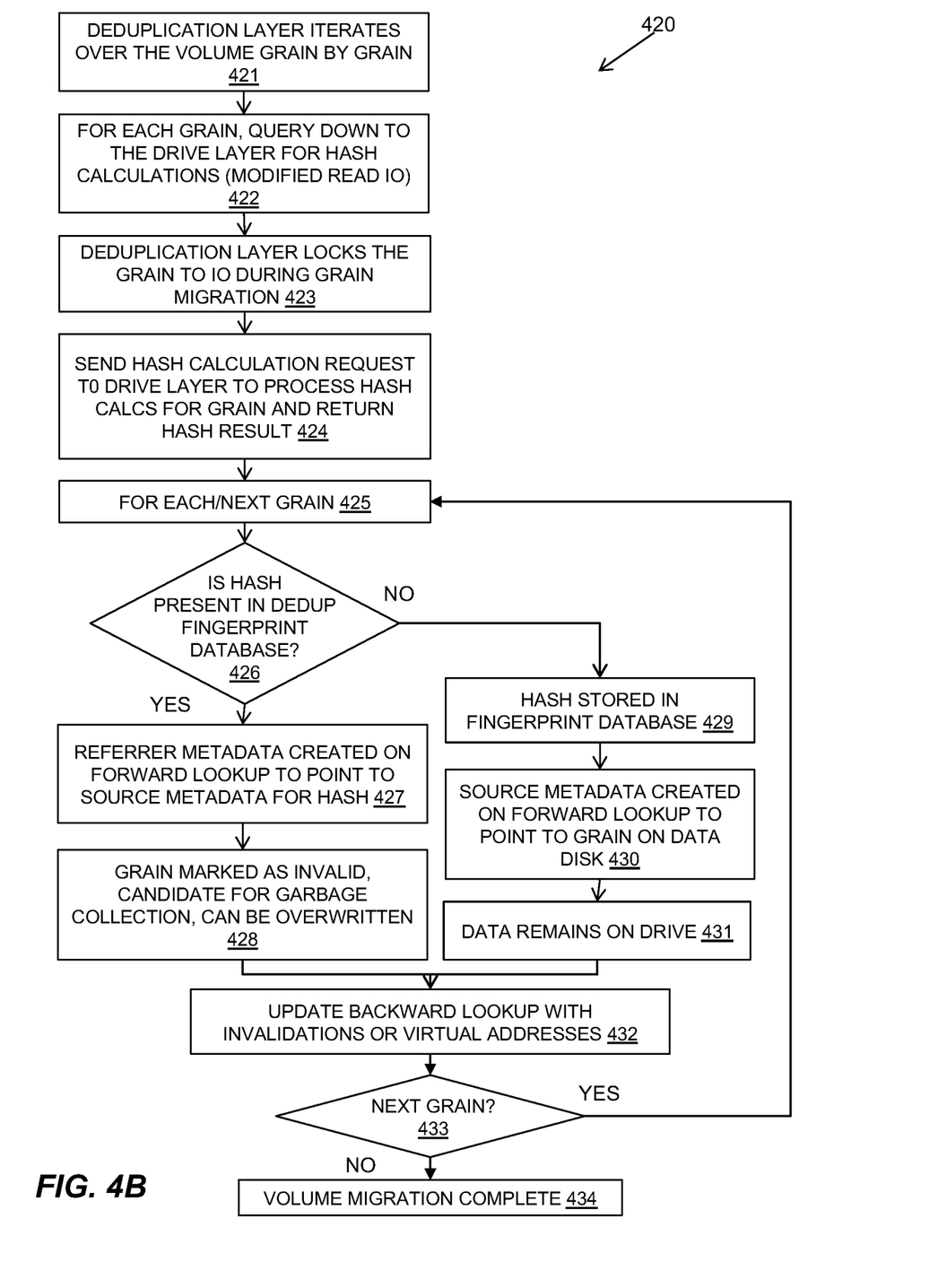

FIGS. 4A and 4B are flow diagrams 400, 420 illustrating an example embodiment of the described method of migration of a fully allocated volume to a deduplicated volume.

Referring to FIG. 4A, the method may receive a user migration request for a fully allocated volume to a deduplicated volume (step 401).

A method at the deduplication layer may reserve a data disk LBA range for the managed disk (MDISK) extents associated currently with the fully allocated volume (step 402).

The method at the deduplication layer may create a passthrough forward lookup structure, for example, in the form of a passthrough forward lookup tree or table, where each LBA points at the relative LBA on the reserved LBA range of the data disk (step 403). The method may also create a stub backward lookup structure (step 404), for example, in the form of a reverse lookup tree or table. At this stage the volume is still fully allocated and IOs might not engage with the deduplication layer.

The method may pause IOs for the volume (step 405). The method at the virtualization layer may move the extents for the volume into the reserved data disk region (step 406).

The method may mark 407 the volume as a deduplicated volume with the deduplication layer and passthrough forward lookup is activated for new IOs. The method may unpause the IOs for the volume (step 408).

Referring to FIG. 4B, the method at the deduplication layer may iterate over the volume, grain by grain to carry out deduplication (step 421). For each grain, the method may query down to the drive layer for hash calculations which may be carried out by a modified read 10 (step 422). The method at the deduplication layer may lock the grain to IO during grain migration and avoid conflicting host IO (step 423).

The method may send a hash calculation request to the drive layer, and the drive layer may process the deduplication hash calculations for the grain and return the hash result (step 424). The method may communicate the hashing algorithm and grain size to a module on the drive layer ahead of time. Each drive has the ability to calculate hashes for data stored on itself.

For each grain and/or next grain (step 425), it is determined if the hash for the grain is present in the deduplication fingerprint database (decision 426). If the hash is present, the method may create referrer metadata on the forward lookup structure to point to source metadata for the hash (step 427). The method may mark 428 the grain in the physical drive as invalid and as a candidate for garbage collection. The grain can now be overwritten with new data.

If the hash is not present in the deduplication fingerprint database, then the grain may be marked as a deduplication miss. The method may store the hash in deduplication fingerprint database (step 429). The method may create source metadata on the forward lookup structure to point to grain on data disk. The data may remain 431 on the drive (step 430).

As each grain is processed, the method may update the backward lookup structure with invalidations and/or virtual addresses (step 432). It is determined if there is a next grain (decision 433). If so, the method may loop to process a next grain in step 422. Once all grains have been analyzed, the volume migration may be complete (step 434).

Thus, migration may take place without unnecessary reading and writing of volume data outside of the drive layer. Data might not be duplicated within a pool as a result of the migration, and additional storage might not be required during the migration. Source data that is unique might not be moved and/or altered. A customer will quickly see their pool capacity consumption drop for volumes with high levels of deduplication. Tiering and heat knowledge may be retained for source grains.

Figure 5:
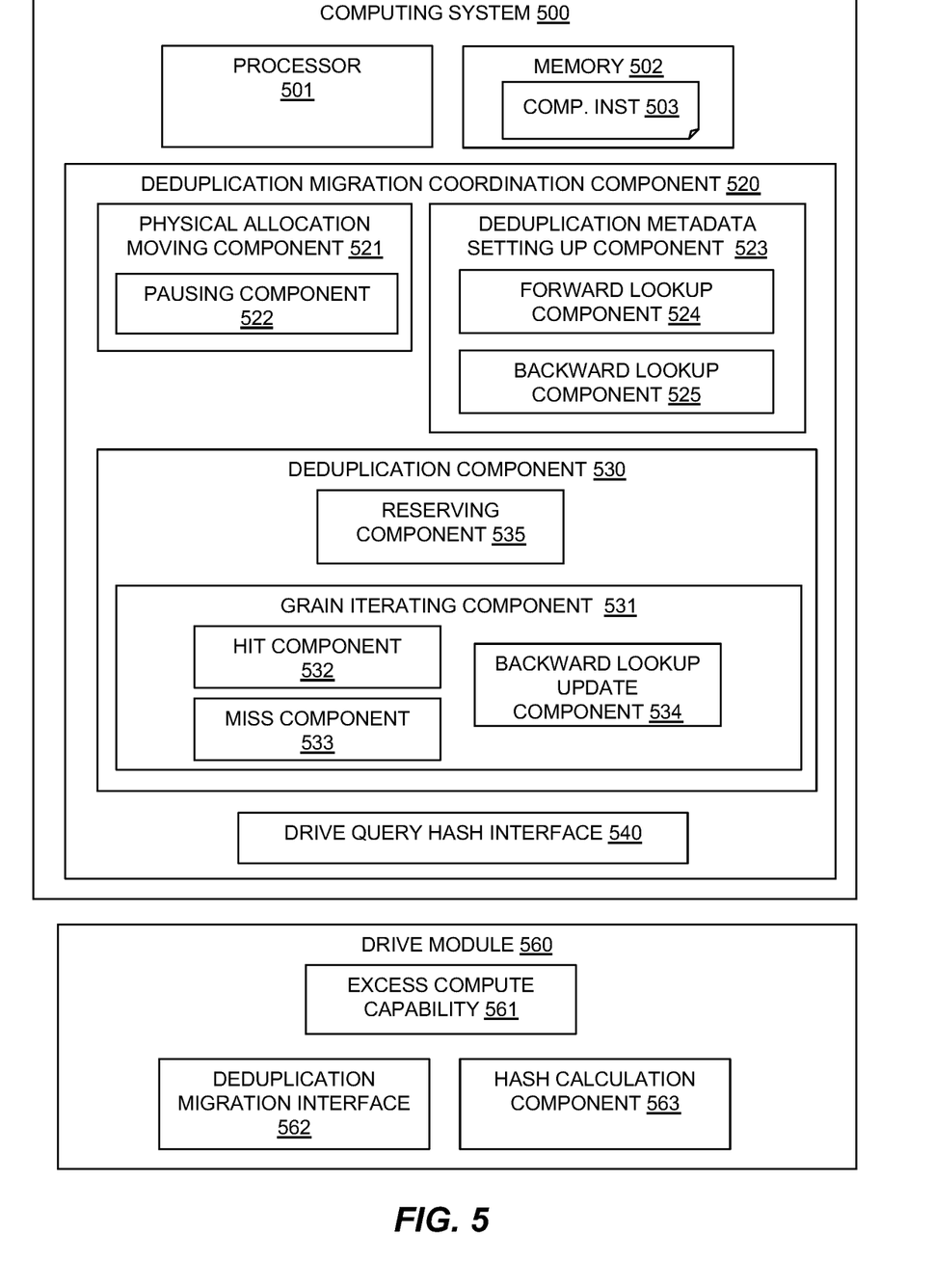
FIG. 5 is block diagram illustrating a system in accordance with an exemplary embodiment of the present invention.

Referring to FIG. 5, a block diagram illustrates an example embodiment of computing system 500. The computing system 500 may include the deduplication migration coordination component 520 and an example drive module 560. The drive module 560 may have excess compute capability 561 and include a deduplication migration interface 562 and a hash calculation component 563 for carrying out the hash calculations for the deduplication migration on the drive module 560.

The computing system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The described is shown as a single component on a computing system 500. However, the deduplication migration component 520 may be provided across multiple computing devices such as at a virtualizing layer and at a deduplication layer of a storage system.

The described deduplication migration component 520 may include a deduplication component 530 including a reserving component 535 for reserving a virtual address range in the deduplication domain to which the physical allocations associated with the fully allocated volume are moved.

The described deduplication migration component 520 may include a physical allocation moving component 521 in a virtualization layer for moving a physical allocation of stored data associated with a full allocation volume into a virtual address range in a deduplication domain. The physical allocation moving component 521 may include a pausing component 522 which may pause input/output operations whilst moving the physical allocation of stored data associated with a full allocation volume into a virtual address range in a deduplication domain.

The described deduplication migration component 520 may include a deduplication metadata setting up component 523 which may set up the deduplication metadata to be a passthrough. The deduplication metadata setting up component 523 may include a forward lookup component 524 for creating a passthrough forward lookup structure for assimilation of the fully allocated volume to the deduplicated volume and a backward lookup component 525 for creating a stub backward lookup structure to be updated with deduplication metadata as the deduplicated volume is deduplicated.

The deduplication component 530 of a deduplication layer may perform a background deduplication process on the virtual address range once populated with the physical allocations using a drive query hash interface 540 to perform hash calculations on physical drives at which the data is stored, wherein the virtual address range becomes a deduplicated volume for the data.

The deduplication component 530 may include a grain iterating component 531 for iterating over grains of the deduplication volume by a deduplication layer with locking of a grain to an input/output operation during a grain deduplication. The grain iterating component 531 may include a hit component 532 for, when a grain is a deduplication hit, creating referrer metadata on a passthrough forward lookup to point to source metadata and marking the grain as invalid; a miss component 533 for, when a grain is a deduplication miss, storing a hash for the grain in a deduplication fingerprint database, creating source metadata on the passthrough forward lookup to point to grain on data disk; and a backward lookup update component 534 for updating a backward lookup with invalidations and/or virtual addresses.

Figure 6:
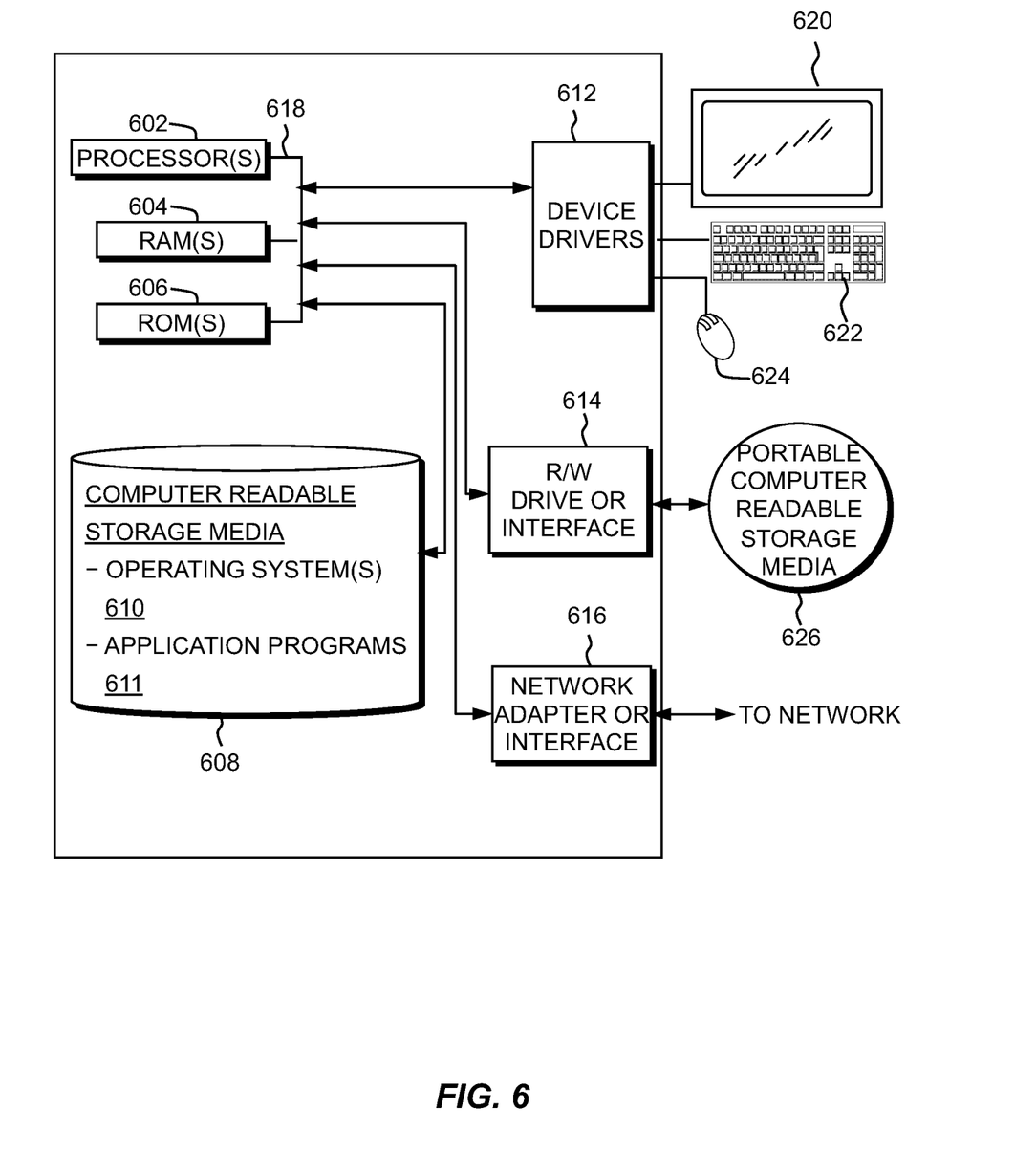
FIG. 6 is a block diagram illustrating a computer system or cloud server in which exemplary embodiments of the present invention may be implemented.

FIG. 6 depicts a block diagram of components of a computing system as used in the virtualization layer, deduplication layer and/or physical layer, in accordance with an exemplary embodiment of the present invention. It should be appreciated that FIG. 6 provides only an illustration of one implementation and does not imply any limitations with regard to the environments in which different embodiments may be implemented. Many modifications to the depicted computing system may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as the deduplication migration coordination component 230, 260 are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective RAY drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
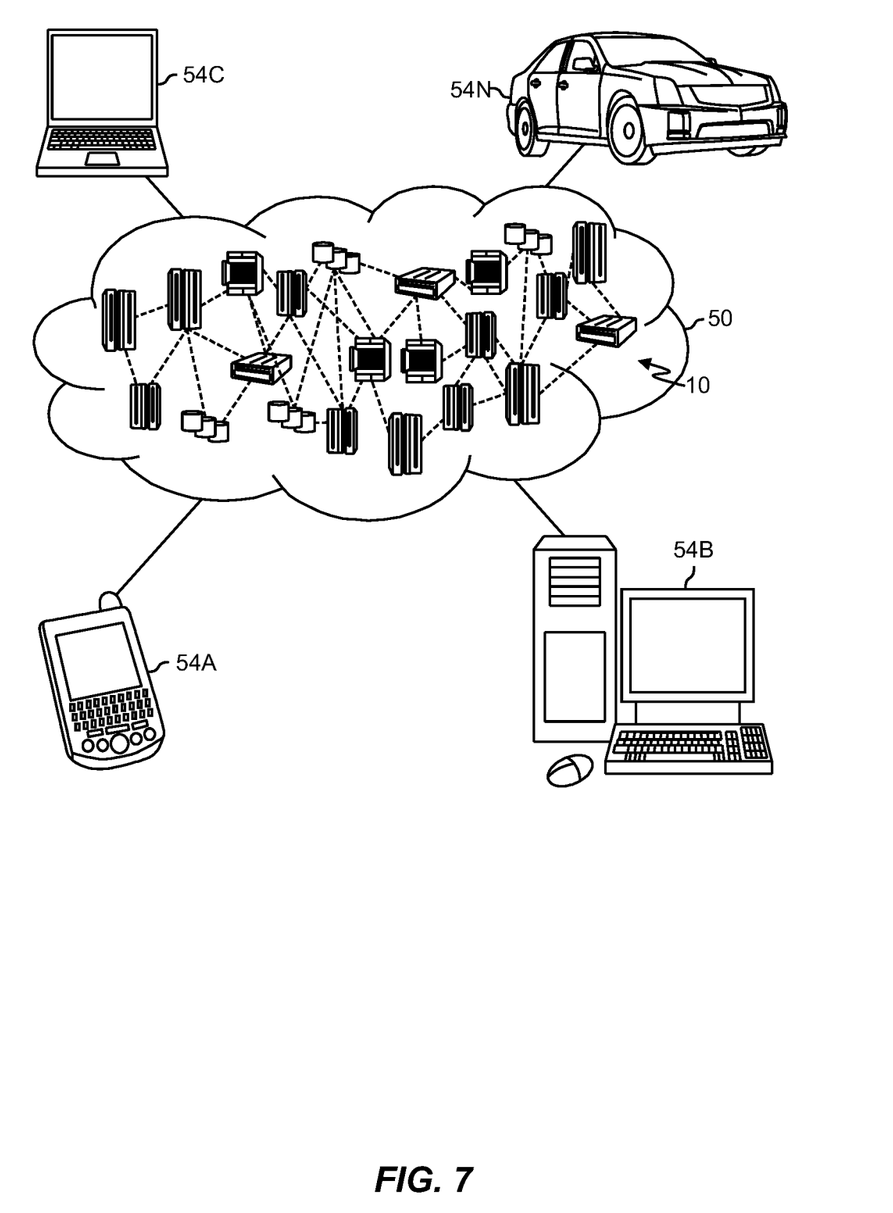
FIG. 7 is a schematic diagram illustrating a cloud computing environment in which exemplary embodiments of the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
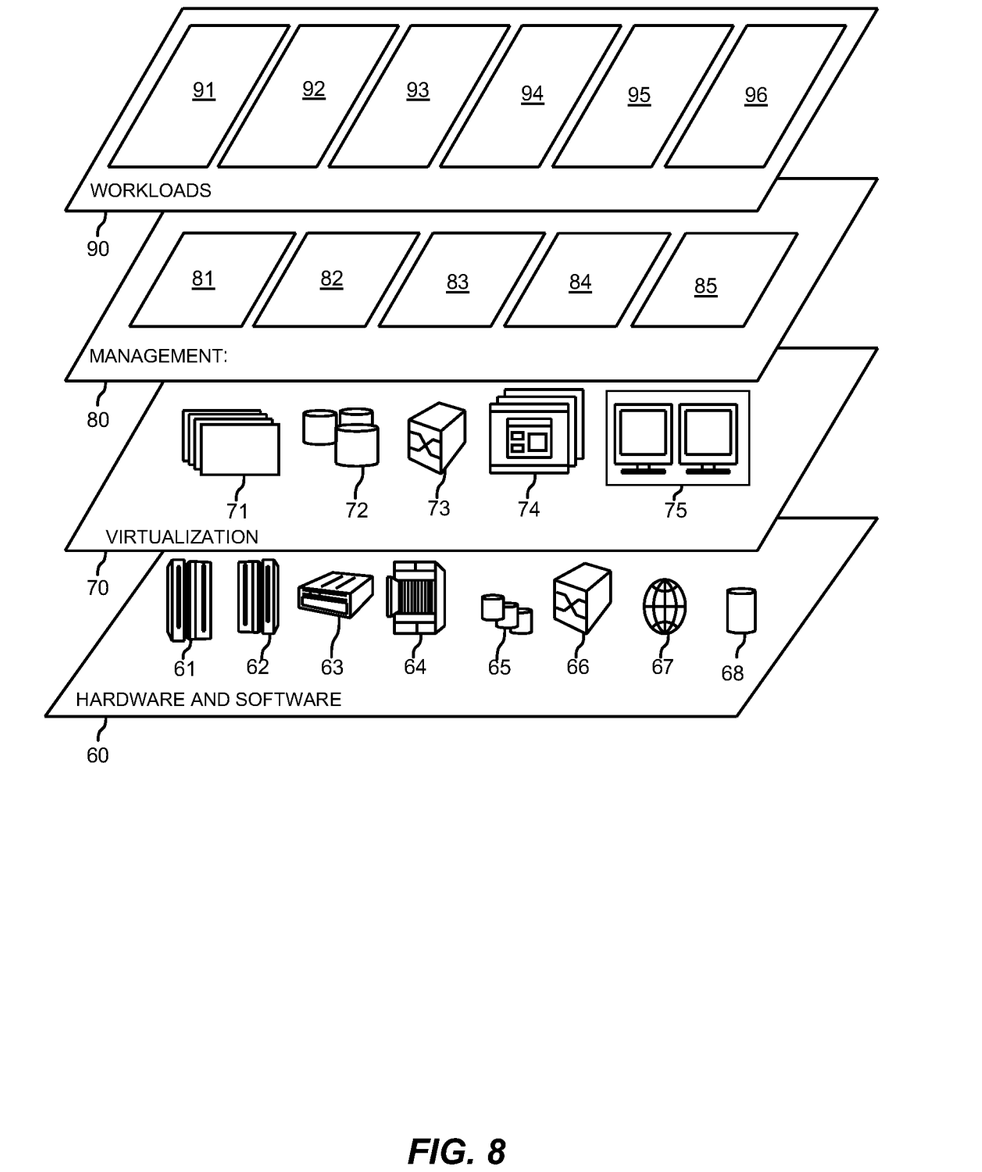
FIG. 8 is a diagram illustrating abstraction model layers of a cloud computing environment in which exemplary embodiments of the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage deduplication processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Modifications can be made to the foregoing without departing from the scope of the present invention.

What is claimed is:

1. A computer-implemented method for full allocation volume to deduplication volume migration in a storage system, said method carried out by one or more processors of a computer system and comprising:
    moving a physical allocation of stored data associated with a full allocation volume into a virtual address range in a deduplication domain and setting up the deduplication metadata to be a passthrough, wherein setting up the deduplication metadata to be a passthrough includes:
        creating a passthrough forward lookup structure for assimilation of the fully allocated volume to the deduplicated volume; and creating a stub backward lookup structure to be updated with deduplication metadata as the deduplicated volume is deduplicated; and
    performing a background deduplication process on the virtual address range once populated with the physical allocations using a drive query hash interface to perform hash calculations on physical drives at which the data is stored, wherein the virtual address range becomes a deduplicated volume for the data.

2. The method of claim 1, including refraining from moving data stored on the physical drives during the method.

3. The method of claim 1, wherein the physical allocation of stored data is a managed disk of data extents associated with physical data extents stored across a plurality of physical drives having excess compute capability at which hash calculations for the deduplication process are performed.

4. The method of claim 1, including pausing input/output operations whilst moving a physical allocation of stored data associated with a full allocation volume into a virtual address range in a deduplication domain.

5. The method of claim 1, including reserving, by a deduplication layer, the virtual address range in the deduplication domain to which the physical allocations associated with the fully allocated volume are moved.

6. The method of claim 1, wherein moving a physical allocation of stored data associated with a full allocation volume into a virtual address range in a deduplication domain is carried out by a virtualization layer and includes marking the volume as a deduplicated volume and activating a deduplication layer and the passthrough metadata.

7. The method of claim 1, wherein performing a background deduplication process includes iterating over grains of the deduplication volume by a deduplication layer with locking of a grain to an input/output operation during a grain deduplication.

8. The method of claim 7, wherein iterating over grains includes:
    when a grain is a deduplication hit, creating referrer metadata on a passthrough forward lookup structure to point to source metadata and marking the grain as invalid;
    when a grain is a deduplication miss, storing a hash for the grain in a deduplication fingerprint database, creating source metadata on the passthrough forward lookup structure to point to grain on data disk; and
    for all grains, updating a backward lookup structure with invalidations or virtual addresses.

9. The method of claim 1, including carrying out hash calculations at a Flash Core Module (FCM) on the drive layer without reading the data from outside the FCM.

10. A system for full allocation volume to deduplication volume migration in a storage system including a processor and a memory configured to provide computer program instructions to the processor to execute the function of the components, the system comprising:
    a physical allocation moving component in a virtualization layer for moving a physical allocation of stored data associated with a full allocation volume into a virtual address range in a deduplication domain; a deduplication metadata setting up component for setting up the deduplication metadata to be a passthrough, wherein setting up the deduplication metadata to be a passthrough includes:
        creating a passthrough forward lookup structure for assimilation of the fully allocated volume to the deduplicated volume; and creating a stub backward lookup structure to be updated with deduplication metadata as the deduplicated volume is deduplicated; and
    a deduplication component of a deduplication layer for performing a background deduplication process on the virtual address range once populated with the physical allocations using a drive query hash interface to perform hash calculations on physical drives at which the data is stored, wherein the virtual address range becomes a deduplicated volume for the data.

11. The system of claim 10, wherein the physical allocation of stored data is a managed disk of data extents associated with physical data extents stored across a plurality of physical drives having excess compute capability at which hash calculations for the deduplication process are performed.

12. The system of claim 10, including a pausing component for pausing input/output operations whilst moving a physical allocation of stored data associated with a full allocation volume into a virtual address range in a deduplication domain.

13. The system of claim 10, including a reserving component in the deduplication layer for reserving the virtual address range in the deduplication domain to which the physical allocations associated with the fully allocated volume are moved.

14. The system of claim 10, wherein the physical allocation moving component includes marking the volume as a deduplicated volume and activating a deduplication layer and the passthrough metadata.

15. The system of claim 10, wherein the deduplication component includes a grain iterating component for iterating over grains of the deduplication volume by a deduplication layer with locking of a grain to an input/output operation during a grain deduplication.

16. The system of claim 15, wherein the grain iterating component includes:
   a hit component for, when a grain is a deduplication hit, creating referrer metadata on a passthrough forward lookup structure to point to source metadata and marking the grain as invalid;
   a miss component for, when a grain is a deduplication miss, storing a hash for the grain in a deduplication fingerprint database, creating source metadata on the passthrough forward lookup structure to point to grain on data disk; and
   a backward lookup update component for updating a backward lookup structure with invalidations or virtual addresses.

17. The system of claim 10, wherein the plurality of physical drives are Flash Core Modules (FCM).

18. A computer program product for full allocation volume to deduplication volume migration in a storage system, the non-transitory computer program product comprising a computer readable storage medium having program instructions embodied therewith, the program instructions executable by a processor to cause the processor to:
   move a physical allocation of stored data associated with a full allocation volume into a virtual address range in a deduplication domain and set up the deduplication metadata to be a passthrough, wherein setting up the deduplication metadata to be a passthrough includes:
      creating a passthrough forward lookup structure for assimilation of the fully allocated volume to the deduplicated volume; and creating a stub backward lookup structure to be updated with deduplication metadata as the deduplicated volume is deduplicated; and
   perform a background deduplication process on the virtual address range once populated with the physical allocations using a drive query hash interface to perform hash calculations on physical drives at which the data is stored, wherein the virtual address range becomes a deduplicated volume for the data.

\* \* \* \* \*